US006824705B1

(12) United States Patent
Mercado et al.

(10) Patent No.: US 6,824,705 B1
(45) Date of Patent: Nov. 30, 2004

(54) BLEACH ODOR REDUCING COMPOSITION

(75) Inventors: Hedeliza Malonzo Mercado, Scarborough (CA); Colette Lallemant, RueilMalmaison (FR); Pierre Boudot, Orsay (FR); John N. Labows, Horsham, PA (US)

(73) Assignee: Colgate-Palmolive Co., New York, NY (US)

( * ) Notice: Subject to any disclaimer, the term of this patent is extended or adjusted under 35 U.S.C. 154(b) by 0 days.

(21) Appl. No.: 10/440,924

(22) Filed: May 19, 2003

(51) Int. Cl.[7] .......................... C01B 11/06; C11D 3/50; C11D 3/395

(52) U.S. Cl. ............................ 252/187.24; 252/187.25; 252/187.26; 252/187.27; 252/186.36; 510/104; 510/105; 510/106; 510/107; 510/131; 510/367

(58) Field of Search ....................... 252/186.34, 186.35, 252/186.36, 187.24, 187.25, 187.26, 187.27; 510/104, 105, 106, 107, 131, 303, 367

(56) References Cited

U.S. PATENT DOCUMENTS

| | | | | |
|---|---|---|---|---|
| 4,878,951 A | * 11/1989 | Pochard et al. | .......... | 134/22.17 |
| 4,946,619 A | * 8/1990 | Fisher | ................... | 252/187.24 |
| 5,057,236 A | * 10/1991 | Petrin et al. | ................ | 510/324 |
| 5,389,157 A | * 2/1995 | Smith | ...................... | 134/22.13 |
| 5,470,499 A | * 11/1995 | Choy et al. | ................. | 510/398 |
| 5,942,153 A | * 8/1999 | Heydel | .................. | 252/187.33 |
| 5,972,864 A | * 10/1999 | Counts | ....................... | 510/192 |
| 6,090,770 A | * 7/2000 | Mendoza et al. | ........... | 510/380 |
| 6,140,293 A | * 10/2000 | Lappas | ....................... | 510/305 |

FOREIGN PATENT DOCUMENTS

| | | |
|---|---|---|
| EP | 0 303 401 A1 | * 6/1981 |
| EP | 0 606 707 A1 | * 7/1994 |
| EP | 0 812 909 A1 | * 12/1997 |
| WO | WO 95/08610 | * 3/1995 |
| WO | WO/9627651 | * 9/1996 |

OTHER PUBLICATIONS

Kao Corporation,Chemical Business Division [Kao's Flavors, fragrances and aroma chemicals Product Information (E)] 2.(1) Aroma Chemicals (Specialty) Mar. 2002 FRUITATE and the hyperlinks from the Google search to the FRUITATE Data Sheet.*

* cited by examiner

*Primary Examiner*—Joseph D. Anthony
(74) *Attorney, Agent, or Firm*—Bernard Lieberman

(57) ABSTRACT

The present invention relates to the use of ethyl tricyclo $[5.2.1.0^{25}]$ decan-2-carboxylate in a hypochlorite containing products to reduce the bleach odor on skin, when such products come in contact with human skin.

1 Claim, No Drawings

BLEACH ODOR REDUCING COMPOSITION

FIELD OF THE INVENTION

The present invention relates to a bleach odor reducing agent which reduces bleach odor on human skin, when a bleach containing product comes in contact with human skin.

BACKGROUND OF THE INVENTION

The odor of bleach is unacceptable on human skin which has come in contact with a bleach cleaning composition during cleaning of a hard surface.

PCT application WO96/27651 teaches a composition containing a halogen bleach, a bleach booster and $NH_2$ compounds for controlling halogen induced skin malodor.

EP patent application EP0812909A1 teaches a hypochlorite bleach containing composition which contains a polycarboxylate polymer to reduce bleach malodor.

PCT application WO95/08610 teaches the use of short chain ($C_6$–$C_{10}$) alkyl sulfate surfaces to reduce bleach odor.

SUMMARY OF THE INVENTION

The present invention relates to a bleach odor reducing agent which reduces bleach odor on human skin, wherein the bleach odor reducing agent can be incorporated in any hypochlorite containing bleach compound.

To achieve the foregoing and other objects in accordance with the purpose of the invention, as embodied and broadly described herein the novel bleach odor reducing agent once solubilized in surfactant that is bleach compatible, preferably, amine oxide, can be added in any hypochlorite containing product. The hypochlorite containing product contains a chlorine containing bleach compound, an alkali metal hydroxide, carbonate, and/or silicate, and/or phosphate, a bleach odor reducing agent, surfactant preferably amine oxide and water, wherein the composition has a pH of at least 9.

DETAILED DESCRIPTION OF THE INVENTION

The present invention relates to the use of ethyl tricyclo $[5.2.1.0^{25}]$ decan-2-carboxylate such as Fruitate™ which is available from the KAO Corporation, which now has been found to be a bleach odor reducing agent capable of reducing the bleach odor on human skin that can be added in any hypochlorite containing product.

The current invention may be used for a wide range of application, such as incorporation in hard surface cleaners, laundry applications, both hand washing as well as washing with washing machine. The composition of applicable hypochlorite containing product comprises approximately by weight:

(a) 0.1% to 10%, more preferably 0.2% to 5% of a chlorine bleach compound;

(b) 0.0001% to 5%, more preferably 0.00005% to 0.4% of a bleach odor reducing agent;

(c) 0.1% to 5%, more preferably 0.5% to 4% of amine oxide surfactant;

(d) 0.05% to 3%, more preferably 0.1% to 1.5% of an alkali metal hydroxide such as sodium hydroxide or potassium hydroxide;

(e) 0.2% to 5%, more preferably 0.3% to 4% of an alkali metal carbonate such as sodium carbonate or potassium carbonate;

(f) 0.1% to 3% of an alkali metal silicate which can acts as a buffer and a corrosion inhibitor;

(g) 0.25% to 5% of a phosphate builder salt;

(h) 0% to 3%, more preferably 0.1% to 1.5% of a fatty acid which functions as a viscosity control agent;

(i) 0% to 1%, more preferably 0.0001% to 0.1% of a silicone foam control agent;

(j) 0% to 0.6%, more preferably 0.1% to 0.5% of a bleach compatible perfume; and (k) the balance being water, wherein the composition has a pH of about 9 to about 14.

An essential ingredient for use herein is hypochlorite. Although any chlorine bleach compound may be employed in the compositions of this invention, such as dichloroisocyanurate, dichloro-dimethyl hydantoin, or chlorinated TSP, alkali metal or alkaline earth metal, e.g. potassium, lithium, magnesium and especially sodium, hypochlorite is preferred. A solution containing about 0.1 to 10.0% by weight of sodium hypochlorite contains or provides the necessary percentage of available chlorine. About 0.2% to 5% by weight of available chlorine is especially preferred. For example, sodium hypochlorite (NaOCl) solution of from about 11 to about 13% available chlorine in amounts of about 1.0 to 79%, preferably about 2.0 to 40.0%, can be advantageously used.

The fruitate needs to be solubilized first in order that it can be incorporated in hypochlorite product. Hence, another essential ingredient is surfactant, preferably amine oxide. Amine oxide semi-polar nonionic surfactants used in the instant composition comprise compounds and mixtures of compounds having the formula

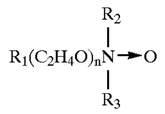

wherein $R_1$ is an alkyl 2-hydroxyalkyl, 3-hydroxyalkyl, or 3-alkoxy-2-hydroxypropyl radical in which the alkyl and alkoxy, respectively, contain from 8 to 18 carbon atoms, $R_2$ and $R_3$ are each methyl, ethyl, propyl, isopropyl, 2-hydroxyethyl, 2-hydroxypropyl, or 3-hydroxypropyl, and n is from 0 to 10. Particularly preferred are amine oxides of the formula:

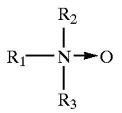

wherein $R_1$ is a $C_{12-16}$ alkyl and $R_2$ and $R_3$ are methyl or ethyl. The above ethylene oxide condensates, amides, and amine oxides are more fully described in U.S. Pat. No. 4,316,824 which is hereby incorporated herein by reference.

The hypochlorite containing product needs to maintain a high pH of about 9 to. 14, preferably 10 to 13 and most preferably between 11 to 12. This is achieved with the addition of alkaline metal salts of hydroxide and buffers. Examples of suitable buffers are salts of carbonate, silicate, phosphate or mixture thereof, but non-limiting to these examples or combination thereof.

The composition may further include additional ingredients such as hypochlorite compatible anti-foams, chelating agents, colourants, perfumes, viscosity control agents and hydrotopes.

The preferred long chain fatty acids used in the instant compositions are the higher aliphatic fatty acids having from about 8 to 22 carbon atoms, more preferably from about 10 to 20 carbon atoms, and especially preferably from about 12 to 18 carbon atoms, inclusive of the carbon atom of the carboxyl group of the fatty acid. The aliphatic radical may be saturated or unsaturated and may be straight or branched. Straight chain saturated fatty acids are preferred. Mixtures of fatty acids may be used, such as those derived from natural sources, such as tallow fatty acid, coco fatty acid, soya fatty acid, etc., or from synthetic sources available from industrial manufacturing processes.

Thus, examples of the fatty acids include, for example, decanoic acid, dodecanoic acid, palmitic acid, myristic acid, stearic acid, tallow fatty acid, coco fatty acid, soya fatty acid, mixtures of these acids, etc. Stearic acid and mixed fatty acids, e.g. stearic acid/palmitic acid, are preferred.

When the free acid form of the fatty acid is used directly it will generally associate with the potassium and sodium ions in the aqueous phase to form the corresponding alkali metal fatty acid soap. However, the fatty acid salts may be directly added to the composition as sodium salt or potassium salt, or as a polyvalent metal salt, although the alkali metal salts of the fatty acids are preferred fatty acid salts.

The amount of the fatty acid or fatty acid salt stabilizer to achieve the desired enhancement of physical stability will depend on such factors as the nature of the fatty acid or its salt, the nature and amount of the thickening agent, detergent active compound, inorganic salts, other ingredients, as well as the anticipated storage and shipping conditions.

Alkali metal (e.g. potassium or sodium) silicate, which provides alkalinity and protection of hard surfaces, such as fine china glaze and pattern, is generally employed in an amount ranging from about 0.1 to 3 weight percent, preferably about 0.2 to 2.5 weight percent in the composition. The sodium or potassium silicate is generally added in the form of an aqueous solution, preferably having $Na_2O:SiO_2$ or $K_2O:SiO_2$ ratio of about 1:1.3 to 1:2.8. A preferred silicate is sodium metasilicate.

A preferred solid phosphate builder salt used in the instant composition is an alkali metal polyphosphate such as sodium tripolyphosphate ("TPP"). One suitable TPP is sold under the name Thermphos NW. The particles size of the Thermphos NW TPP, as supplied is usually averages about 200 microns with the largest particles being about 400 microns. In place of all or part of the alkali metal polyphosphate one or more other detergent builder salts can be used. Suitable other builder salts are alkali metal carbonates, phosphates, silicates, lower polycarboxylic acid salts, and polyacrylates, polymaleic anhydrides and copolymers of polyacrylates and polymaleic anhydrides and polyacetal carboxylates.

Specific examples of such builders are sodium carbonate, potassium carbonate, sodium pyrophosphate, sodium tripolyphosphate, potassium tripolyphosphate, potassium pyrophosphate, sodium hexametaphosphate, sodium sesquicarbonate, sodium mono and diorthophosphate. The builder salts can be used alone with the amine oxide nonionic surfactant or in an admixture with other builders.

Essentially, any compatible anti-foaming agent can be used in the instant composition. Preferred anti-foaming agents are silicone anti-foaming agents. These are alkylated polysiloxanes and include polydimethyl siloxanes, polydiethyl siloxanes, polydibutyl siloxanes, phenyl methyl siloxanes, trimethysilanated silica and triethylsilanated silica. A suitable anti-foaming agent is Silicone TP201 or Silicone RD from Union Carbide.

About 98 different perfume oils that are compatible with bleach were initially screened, of which only 13 were evaluated further in a panel test situation. There were three oils that passed the panel tests when incorporated at 0.015% in a 5% hypochlorite bleach. These were the fruitate, cumin nitrile and cornmint. To ensure that the effect was not due to the masking of the bleach odor being perfume oils, the level was further reduced to 0.0001%. Only Fruitate passed the test.

DESCRIPTION OF THE PREFERRED EMBODIMENTS

The following formula was made with and without Fruitate and subjected to a panel test for odor evaluation.

| | Without Fruitate | With Fruitate |
|---|---|---|
| % NaOCl | 5.25 | 5.25 |
| % NaOH | 0.7 | 0.7 |
| % Na2CO3 | 1.5 | 1.5 |
| % Fruitate | 0 | 0.0001 |
| % Softened Water | To 100 | To 100 |

Results showed that Fruitate Formula has less bleach smell than the formula without fruitate:

| | % of Respondents |
|---|---|
| On skin | 90 |
| On sponge | 97 |
| On skin after rinsing | 87 |

As well, the Fruitate formula was preferred as shown:

| | |
|---|---|
| On skin | 73 |
| On sponge | 70 |
| On skin after rinsing | 73 |

Another test conducted was to incorporate fruitate in Javel Plus Lavande currently being marketed in France and in a regular multi-surface bleach cleaner (MSBC) being marketed globally by Colgate Palmolive, both of which contained compounded perfumes. Then a panel test was conducted and results showed that products with Fruitate were judged to have less bleach smell and preferred over the existing products without Fruitate:

| | % of Respondents | |
|---|---|---|
| | In Javel Plus Lavande | Regular MSBC |
| Less Bleach Smell | | |
| On skin | 67 | 67 |
| On sponge | 80 | 63 |
| On skin after rinsing | 83 | 73 |
| Preference | | |
| On skin | 73 | 70 |
| On sponge | 80 | 67 |
| On skin after rinsing | 73 | 70 |

Further comparison was done between 0.0001% Fruitate and 0.0001% Lavander perfume in a multi-surface bleach cleaner (MSBC). The lavender perfume is a complete fragrance formula used in existing MSBC product. Results showed that MSBC with Fruitate was judged to have less bleach smell and preferred significantly over MSBC with the Lavander perfume as shown:

Fruitate formula has less bleach smell than non-fruitate MSBC:

| | % of Respondents |
|---|---|
| On skin | 63 |
| On sponge | 67 |
| On skin after rinsing | 73 |

As well, the Fruitate formula was preferred as shown:

| | |
|---|---|
| On skin | 67 |
| On sponge | 60 |
| On skin after rinsing | 67 |

The Panel Test Method consists of:

1. Recruit at least 15 panelists.
2. A paired comparison between two products is always conducted.
3. Each respondent is asked to rinse each hand in a 4L beaker of tap water at room temperature by dipping the hands into the water for five times. The hands are pat dried on a clean towel.
4. On each hand, a sponge containing 6 drops of bleach products that are being compared are squeezed for 3 times. Fresh sponge is used with each product per respondent.
5. The respondents are then asked to smell their hands one after the other, smelling the left hand first and ask the following questions:
   a. Which smells more bleach?
   b. Which do you prefer?
6. The respondents are then asked to smell the sponge, starting with the left sponge and ask the same question as in #5.
7. Rinse the hands as in step 3.
8. Smell the hands as in step 5 and ask the same questions.
9. Repeat the test among the same group of respondents but this time, the smelling should start with the right hand.
10. Total the answers.

What is claimed is:

1. A bleach containing composition consisting essentially of by weight:

(a) about 0.1% to about 10% of an alkali or alkaline metal hypochlorite bleach compound;

(b) about 0.0001% to about 5% of a bleach odor reducing agent which is ethyl tricyclo [5.2.1.$0^{26}$] decan-2-carboxylate, (c) about 0.1% to about 5% of an amine oxide surfactant of the formula

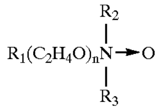

wherein $R_1$ is $C_{12}$–$C_{16}$ alkyl: $R_2$ and $R_3$ are each methyl, ethyl, propyl, isopropyl, 2-hydroxyethyl, 2-hydroxypropyl, or 3-hydroxypropyl and n is from 0 to 10;

(d) about 0.05% to about 3% of an alkali metal hydroxide;

(e) about 0.2% to about 5% of an alkali metal carbonate;

(9 about 0.1% to about 3% of an alkali metal silicate;

(g) about 0.25% to about 5% of a phosphate builder salt; and (h) the balance being water, wherein the composition has a pH of about 9 to about 14.

* * * * *